United States Patent
Black et al.

(10) Patent No.: US 12,212,348 B2
(45) Date of Patent: Jan. 28, 2025

(54) CONTROLLING IMPEDANCE MATCHING CIRCUITRY

(71) Applicant: Google LLC, Mountain View, CA (US)

(72) Inventors: Gregory Black, Vernon Hills, IL (US); Benjamin White, Crystal Lake, IL (US); Srenik Mehta, Fremont, CA (US)

(73) Assignee: Google LLC, Mountain View, CA (US)

( * ) Notice: Subject to any disclaimer, the term of this patent is extended or adjusted under 35 U.S.C. 154(b) by 459 days.

(21) Appl. No.: 17/753,020

(22) PCT Filed: Dec. 5, 2019

(86) PCT No.: PCT/US2019/064788
§ 371 (c)(1),
(2) Date: Feb. 15, 2022

(87) PCT Pub. No.: WO2021/066854
PCT Pub. Date: Apr. 8, 2021

(65) Prior Publication Data
US 2022/0337273 A1 Oct. 20, 2022

Related U.S. Application Data

(60) Provisional application No. 62/908,873, filed on Oct. 1, 2019.

(51) Int. Cl.
*H04B 1/00* (2006.01)
*H04B 1/04* (2006.01)

(52) U.S. Cl.
CPC .......... *H04B 1/006* (2013.01); *H04B 1/0458* (2013.01)

(58) Field of Classification Search
CPC .... H04B 1/006; H04B 1/0064; H04B 1/0458; H04B 1/18; H04B 1/40; H04B 1/401;
(Continued)

(56) References Cited

U.S. PATENT DOCUMENTS 8,942,644 B2 * 1/2015 Schell .................. H04B 1/0064
455/552.1
9,037,123 B2 * 5/2015 Malmbak ................ H04W 4/50
455/418

(Continued)

FOREIGN PATENT DOCUMENTS

| CN | 204991941 U | * | 1/2016 |
| CN | 205017319 U | * | 2/2016 |
| CN | 106911356 A |   | 6/2019 |

OTHER PUBLICATIONS

International Preliminary Report on Patentability from International Application No. PCT/US2019/064788, dated Apr. 14, 2022, 13 pp.

(Continued)

*Primary Examiner* — Quochien B Vuong
(74) *Attorney, Agent, or Firm* — Shumaker & Sieffert, P.A.

(57) ABSTRACT

A system for controlling an impedance matching circuitry can include an antenna, a receiving or transmitting circuitry, an impedance matching circuitry, a circuitry, and a controller. The impedance matching circuitry can be coupled between the antenna and the receiving or transmitting circuitry. The circuitry can be configured to set a value of an impedance of the impedance matching circuitry. The controller can be configured to determine, based on a state of an electronic device, that the electronic device is configured to perform one or more functions with one or more of a satellite radio navigation signal at a first or a second frequency, a wireless local area network signal at a third or a fourth frequency, or a personal area network signal at a fifth or a sixth frequency. The controller can be configured to control, in response to a determination of the state of the electronic device, the circuitry.

20 Claims, 16 Drawing Sheets

(58) Field of Classification Search
CPC . H04B 1/50; H04B 1/54; H04W 4/02; H04W 4/021; H04W 4/30; H04W 4/33
See application file for complete search history.

(56) References Cited

U.S. PATENT DOCUMENTS

2015/0097731 A1* 4/2015 Russell .................. G01S 5/012
 342/450
2016/0112073 A1* 4/2016 Lum .................... H04B 1/0057
 370/297

OTHER PUBLICATIONS

International Search Report and Written Opinion of International Application No. PCT/US2019/064788, mailed Aug. 12, 2020, 21 pp.

* cited by examiner

| | | |
|---|---|---|
| L1 | not used | L10 | 10.6031 nH |
| C1 | not used | C10 | not used |
| L2 | 1.74599 nH | L11 | 0 Ohms |
| C2 | 0.599199 pF | C11 | 1.19238 pF |
| L3 | 2.34318 nH | L12 | 2.50609 nH |
| C3 | not used | C12 | 0 Ohms |
| L4 | 0 Ohms | L13 | 0.992838 nH |
| C4 | not used | C13 | 0 Ohms |
| L5 | 6.43858 nH | L14 | 8.09206 nH |
| C5 | 0 Ohms | C14 | 0 Ohms |
| L6 | not used | L15 | not used |
| C6 | not used | C15 | 0.121746 pF |
| L7 | not used | L16 | 28.3158 nH |
| C7 | 13.1186 pF | C16 | not used |
| L8 | 4.97548 nH | L17 | 6.92424 nH |
| C8 | not used | C17 | not used |
| L9 | 1.23346 nH | L18 | 1.73641 nH |
| C9 | 1.37627 pF | C18 | 0.96074 pF |

FIG. 14

| State No. | SW1 | SW2 | SW3 | SW4 | SW5 | SW6 | SW7 | SW8 |
|---|---|---|---|---|---|---|---|---|
| 1 | closed | closed | opened | opened | opened | opened | closed | opened |
| 2 | opened | opened | opened | closed | opened | closed | opened | opened |
| 3 | opened | opened | closed | opened | closed | closed | closed | closed |
| 4 | opened | closed | opened | closed | opened | opened | closed | opened |

Determine, based on a state of an electronic device, that the electronic device is configured to perform one or more functions with one or more of a satellite radio navigation signal at a first frequency, a satellite radio navigation signal at a second frequency, a wireless local area network signal at a third frequency, a wireless local area network signal at a fourth frequency, a personal area network signal at a fifth frequency, or a personal area network signal at a sixth frequency

1704

Control, in response to a determination of the state of the electronic device, a circuitry configured to set a value of an impedance of an impedance matching circuitry coupled between an antenna and a receiving or transmitting circuitry

FIG. 17

CONTROLLING IMPEDANCE MATCHING CIRCUITRY

CROSS-REFERENCE TO RELATED APPLICATIONS

This application is a national stage entry of WO International Patent Application No. PCT/US2019/064788, filed 5 Dec. 2019, which claims the benefit of U.S. Provisional Patent Application No. 62/908,873, filed 1 Oct. 2019, the entire content of each application is incorporated herein by reference.

BACKGROUND

An electronic device can be configured to perform a plurality of operations in response to a receipt of a plurality of signals of electromagnetic radiation. Unfortunately, a size of the electronic device can limit a number of antennas included in the electronic device. For this reason, the electronic device often can include circuitry configured so that a same antenna can be used to receive at least some of the plurality of signals.

BRIEF SUMMARY

An implementation of the disclosed technologies can include a mobile communication device. The mobile communication device can include a wireless local area network (WLAN) transceiver, a satellite global positioning system (GPS) receiver, an antenna, a switchable impedance matching circuit, and a controller. The switchable impedance matching circuit can be coupled between the antenna and the WLAN transceiver and the GPS receiver. The controller can be configured to determine a state of the mobile communication device. The state can be one of various states. The various states can include an indoor state and an outdoor state. The controller can be configured to set, based on the mobile communication device being in the indoor state, the switchable impedance matching circuitry to a state for the antenna to communicate a WLAN signal in a WLAN frequency band. The controller can be configured to set, based on the mobile communication device being in the outdoor state, the switchable impedance matching circuitry to a state for the antenna to communicate a GPS signal in a GPS frequency band.

An implementation of the disclosed technologies can include a mobile communication device. The mobile communication device can include means for determining a state of the mobile communication device. The state can be one of various states. The various states can include an indoor state and an outdoor state. The mobile communication device can include means for setting, based on the mobile communication device being in the indoor state, a switchable impedance matching circuitry to a state for an antenna to communicate a wireless local area network (WLAN) signal in a WLAN frequency band to a WLAN transceiver. The mobile communication device can include means for setting, based on the mobile communication device being in the outdoor state, the switchable impedance matching circuitry to a state for the antenna to communicate a satellite global positioning system (GPS) signal in a GPS frequency band to a GPS receiver.

An implementation of the disclosed technologies can include a mobile device. The mobile communication device can include a wireless local area network (WLAN) transceiver, a satellite global positioning system (GPS) receiver, a first antenna, a first switchable impedance matching circuit, a second antenna, a second switchable impedance matching circuit, and a controller. The WLAN transceiver can be operable in multiple bands. The GPS receiver can be operable in multiple bands. The first switchable impedance matching circuit can be coupled between the first antenna and the WLAN transceiver and the GPS receiver. The second switchable impedance matching circuit can be coupled between the second antenna and the WLAN transceiver and the GPS receiver. The controller can be configured to switch one or more of the first switchable impedance matching circuit or the second switchable impedance matching circuit to set a circuitry state of the mobile device. The circuitry state can be one of various states. The various states can include a first state in which the first antenna can be configured to communicate one of a GPS signal in a GPS frequency band and a WLAN signal in a WLAN frequency band. The various states can include a second state in which: (1) the first antenna can be configured to communicate more than one of the GPS signal in the GPS frequency band and the WLAN signal in the WLAN frequency band and (2) the second antenna can be configured to communicate the WLAN signal in the WLAN frequency band.

An implementation of the disclosed technologies can include a mobile communication device. The mobile communication device can include means for switching one or more of a first switchable impedance matching circuit or a second switchable impedance matching circuit to set a circuitry state of the mobile device. The circuitry state can be one of various states. The various states can include a first state in which a first antenna can be configured to communicate one of a satellite global positioning system (GPS) signal in a GPS frequency band to a GPS receiver operable in multiple bands and a wireless local area network (WLAN) signal in a WLAN frequency band to a WLAN transceiver operable in multiple bands. The various states can include a second state in which: (1) the first antenna can be configured to communicate more than one of the GPS signal in the GPS frequency band and the WLAN signal in the WLAN frequency band and (2) a second antenna can be configured to communicate the WLAN signal in the WLAN frequency band.

Additional features, advantages, and embodiments of the disclosed technologies are set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed technologies, are incorporated in and constitute a part of this specification. The drawings also illustrate embodiments of the disclosed technologies and together with the detailed description serve to explain the principles of implementations of the disclosed technologies. No attempt is made to show structural details in more detail than may be necessary for a fundamental understanding of the disclosed technologies and various ways in which it may be practiced.

FIG. 14 is a table of an example of values of passive devices included in the ninth example of the system for controlling an impedance matching circuitry, according to the disclosed technologies.

FIG. 15 is a table of an example of positions of switches as functions of states included in the ninth example of the system for controlling an impedance matching circuitry, according to the disclosed technologies.

FIG. 17 is a flow diagram of an example of a method for controlling an impedance matching circuitry, according to the disclosed technologies.

DETAILED DESCRIPTION

Figure 1:
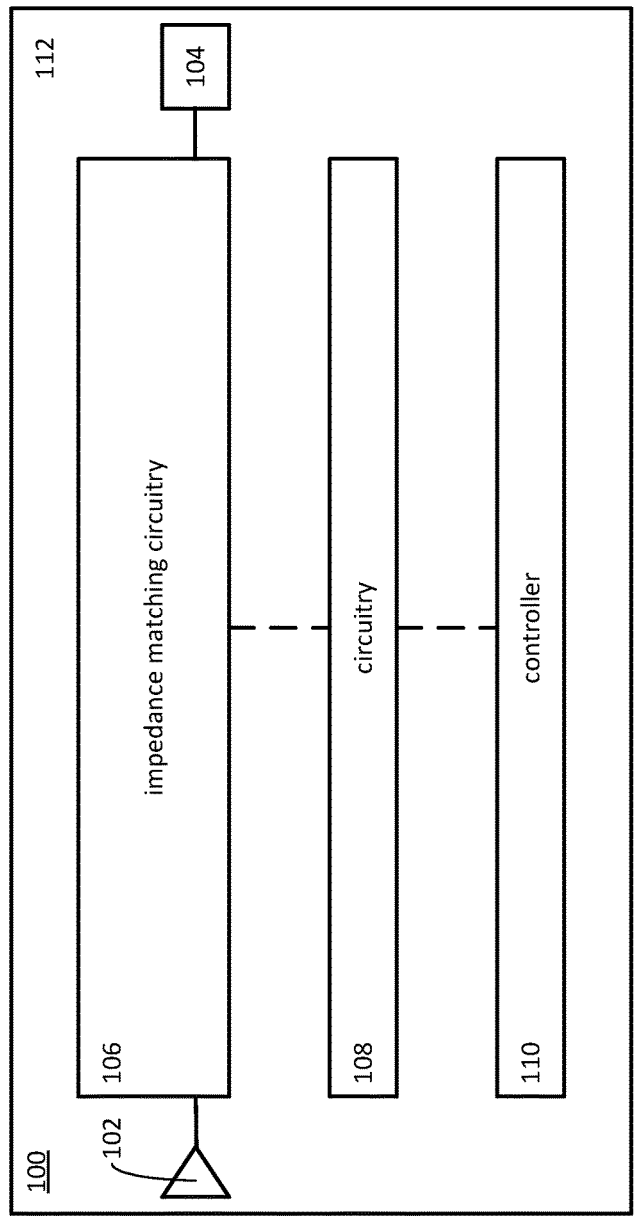
FIG. 1 is a block diagram of a first example of a system for controlling an impedance matching circuitry, according to the disclosed technologies.

As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

An electronic device can be configured to perform a plurality of operations in response to a receipt of a plurality of signals of electromagnetic radiation. Unfortunately, a size of the electronic device can limit a number of antennas included in the electronic device. For this reason, the electronic device often can include circuitry configured so that a same antenna can be used to receive at least some of the plurality of signals.

Usually, a first signal, of the at least some of the plurality of signals, can be at a first frequency and a second signal, of the at least some of the plurality of signals, can be at a second frequency. Impedance is a function of frequency. An antenna system can be configured to receive or transmit a signal. The antenna system can include an antenna and a receiving or transmitting circuitry. In the antenna system, maximum power transfer between the antenna and the receiving or transmitting circuitry can occur if a mathematical expression of an impedance of the antenna is a complex conjugate of a mathematical expression of an impedance of the receiving or transmitting circuitry. This condition can be referred to as having the impedance of the antenna matched to the impedance of the receiving or transmitting circuitry. If the impedance of the receiving or transmitting circuitry does not match the impedance of the antenna, then a substantial loss of power of the signal can occur. Such a substantial loss of power can cause a power of the signal to be less than a receiver sensitivity power threshold or an uplink signal power threshold. Having the power of the signal be less than the receiver sensitivity power threshold or the uplink signal power threshold can cause the antenna system to fail to meet a figure of merit for a performance. For example, the antenna system may fail to meet a Total Integrated Sensitivity (TIS) figure of merit for a receiver or a Total Radiated Power (TRP) figure of merit for a transmitter.

In an electronic device that includes circuitry configured so that a same antenna can be used to receive at least some of a plurality of signals, the disclosed technologies can improve a degree to which the impedance of the receiving or transmitting circuitry matches the impedance of the antenna.

The disclosed technologies can include a system for controlling an impedance matching circuitry. The system can include, for example, a first antenna, a first receiving or transmitting circuitry, a first impedance matching circuitry, a first circuitry, a second antenna, a second receiving or transmitting circuitry, a second impedance matching circuitry, a second circuitry, and a controller. The first impedance matching circuitry can be coupled between the first antenna and the first receiving or transmitting circuitry. The first circuitry can be configured to set a value of an impedance of the first impedance matching circuitry. The second impedance matching circuitry can be coupled between the second antenna and the second receiving or transmitting circuitry. The second circuitry can be configured to set a value of an impedance of the second impedance matching circuitry. The controller can be configured to determine, based on a state of an electronic device, that the electronic device is configured to perform one or more functions with one or more of a satellite radio navigation signal at a first frequency, a satellite radio navigation signal at a second frequency, a wireless local area network signal at a third frequency, a wireless local area network signal at a fourth frequency, a personal area network signal at a fifth frequency, or a personal area network signal at a sixth frequency. For example, the personal area network signal can have an effective maximum range of about one hundred meters. The system can be disposed in the electronic device. The controller can be configured to control, in response to a determination of the state of the electronic device, the first circuitry and the second circuitry.

The disclosed technologies can further include a method for controlling an impedance matching circuitry, e.g., in a system that includes, for example, a first antenna, a first receiving or transmitting circuitry, a first impedance matching circuitry coupled between the first antenna and the first receiving or transmitting circuitry, a first circuitry configured to set a value of an impedance of the first impedance matching circuitry, a second antenna, a second receiving or transmitting circuitry, a second impedance matching circuitry coupled between the second antenna and the second receiving or transmitting circuitry, and a second circuitry configured to set a value of an impedance of the second impedance matching circuitry. The method can include determining, by a processor and based on a state of an electronic device, that the electronic device is configured to perform one or more functions with one or more of a satellite radio navigation signal at a first frequency, a satellite radio navigation signal at a second frequency, a wireless local area network signal at a third frequency, a wireless local area network signal at a fourth frequency, a personal area network signal at a fifth frequency, or a personal area network signal at a sixth frequency. For example, the personal area network signal can have an effective maximum range of about one hundred meters. The method can include controlling, by the processor and in response to a determination of the state of the electronic device, the first circuitry and the second circuitry.

The disclosed technologies can further include a non-transitory computer-readable medium storing computer code for controlling an impedance matching circuitry, e.g., in a system that includes, for example, a first antenna, a first receiving or transmitting circuitry, a first impedance matching circuitry coupled between the first antenna and the first receiving or transmitting circuitry, a first circuitry configured to set a value of an impedance of the first impedance matching circuitry, a second antenna, a second receiving or transmitting circuitry, a second impedance matching circuitry coupled between the second antenna and the second receiving or transmitting circuitry, and a second circuitry configured to set a value of an impedance of the second impedance matching circuitry. The computer code can include instructions to cause the processor to determine, based on a state of an electronic device, that the electronic device is configured to perform one or more functions with one or more of a satellite radio navigation signal at a first frequency, the satellite radio navigation signal at a second frequency, a wireless local area network signal at a third frequency, the wireless local area network signal at a fourth frequency, a personal area network signal at a fifth frequency, or the personal area network signal at a sixth frequency. The personal area network signal can have an effective maximum range of about one hundred meters. The computer code can include instructions to cause the processor to control, in response to a determination of the state of the electronic device, the first circuitry and the second circuitry.

In an implementation of the disclosed technologies, the system for controlling an impedance matching circuitry can include one or more switches. At least one of the one or more switches can be coupled and/or can be configured to be coupled between one or more portions of an impedance matching circuitry and a corresponding receiving or transmitting circuitry. Furthermore, the at least one of the one or more switches can be coupled and/or can be configured to be coupled between an antenna and a corresponding one or more portions of an impedance matching circuitry. Additionally, the one or more portions of the impedance matching circuitry can include one or more sub-portions of the impedance matching circuitry, and the at least one of the one or more switches can be coupled and/or can be configured to be coupled between a first sub-portion, of the one or more sub-portions, and a second sub-portion of the one or more sub-portions.

FIG. 1 is a block diagram of a first example of a system for controlling an impedance matching circuitry, according to the disclosed technologies. The system 100 can include, for example, a first antenna 102, a first receiving or transmitting circuitry 104, a first impedance matching circuitry 106, a first circuitry 108, and a controller 110. For example, the first receiving or transmitting circuitry 104 can include a power combiner. For example, the first receiving or transmitting circuitry 104 can include one or more receivers, one or more transmitters, or one or more transceivers. The first impedance matching circuitry 106 can be coupled between the first antenna 102 and the first receiving or transmitting circuitry 104. The first circuitry 108 can be configured to set a value of an impedance of the first impedance matching circuitry 106. The controller 110 can be configured to determine, based on a state of an electronic device 112, that the electronic device 112 is configured to perform one or more functions with one or more of a satellite radio navigation signal at a first frequency, a satellite radio navigation signal at a second frequency, a wireless local area network signal at a third frequency, a wireless local area network signal at a fourth frequency, a personal area network signal at a fifth frequency, or a personal area network signal at a sixth frequency. For example, the personal area network signal can have an effective maximum range of about one hundred meters. The system can be disposed in the electronic device 112. The controller 110 can be configured to control, in response to a determination of the state of the electronic device 112, the first circuitry 108.

For example, the electronic device 112 can include a desktop computer, a laptop computer, a notebook computer, a tablet computer, a personal digital assistant, a mobile phone, a cell phone, a smart phone, wearable technology, or the like.

For example, the satellite radio navigation signal can be provided by the Global Positioning System (GPS). For example, for a GPS L5 Band receiver, the first frequency can be 1176.45 MHz. Alternatively, for example, for a GPS L1 Band receiver, the first frequency can be 1574.42 MHz. For example, the second frequency can be 1575.42 MHz. Alternatively, for example, the second frequency can be 1176.45 MHz. For example, the wireless local area network signal can be provided by WiFi™ technology. For example, the third frequency can be 2.4 GHz. For example, the fourth frequency can be 5 GHz. For example, the personal area network signal can be provided by Bluetooth® technology. For example, each of the fifth frequency and the sixth frequency can be a frequency in a range from 2400 MHz to 2483.5 MHz. The sixth frequency can be different from the fifth frequency.

In an example, the controller 110 can be further configured to determine, based on the state of the electronic device 112, that the electronic device 112 is configured to perform one or more functions with one or more of a near-field communication signal at a seventh frequency, a near-field communication signal at an eighth frequency, or a cellular network signal at a ninth frequency.

In an example, the state of the electronic device 112 can be defined by one or more of a time, a frequency of an electromagnetic radiation received at the first antenna 102, a charge level of the electronic device 112, the electronic device 112 being charged, the electronic device 112 having a cable connected to the electronic device 112, the electronic device 112 being used to operate a specific application, the electronic device 112 being used to convey the personal area network signal, the electronic device 112 being used to present one or more of video information or audio information, the electronic device 112 being in proximity to another object, a measure of a reflection coefficient or impedance of the first antenna 102, an orientation of the electronic device 112, a location of the electronic device 112 being one of outside of a building or inside of the building, or the like.

In an example, the controller 110 can be configured to control: (1) in response to the determination of the state of the electronic device 112 being that a location of the electronic device 112 is outside of a building, the first circuitry 108 to set the value of the impedance of the first impedance matching circuitry 106 to a first value so that the electronic device 112 is configured to perform the one or more functions with the satellite radio navigation signal at the first frequency and (2) in response to the determination of the state of the electronic device 112 being that the location of the electronic device 112 is inside of the building, the first circuitry 108 to set the value of the impedance of the first impedance matching circuitry 106 to a second value so that the electronic device 112 is configured to perform the one or more functions with the wireless local area network signal at the third frequency.

The electronic device 112 can be configured to determine whether a location of the electronic device 112 is one of outside of a building or inside of the building.

Figure 2:
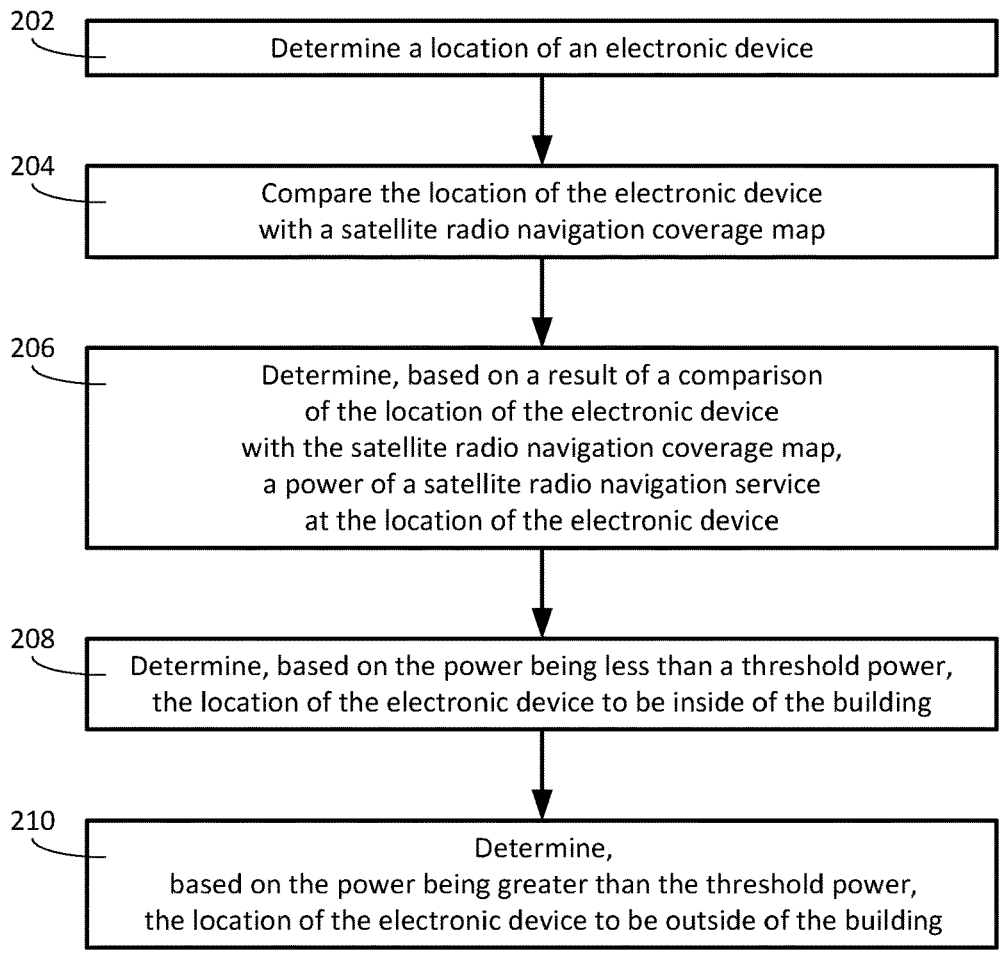
FIG. 2 is a flow diagram of a first example of a method for controlling an impedance matching circuitry based on a location of an electronic device, according to the disclosed technologies.

FIG. 2 is a flow diagram of a first example of a method for controlling an impedance matching circuitry based on a location of an electronic device, according to the disclosed technologies.

In the method 200, at an operation 202, the location of the electronic device can be determined.

At an operation 204 the location of the electronic device can be compared with a satellite radio navigation coverage map.

At an operation 206, based on a result of a comparison of the location of the electronic device with the satellite radio navigation coverage map, a power of a satellite radio navigation service at the location of the electronic device can be determined.

At an operation 208, based on the power being less than a threshold power, the location of the electronic device can be determined to be inside of the building.

At an operation 210, based on the power being greater than the threshold power, the location of the electronic device can be determined to be outside of the building.

Figure 3:
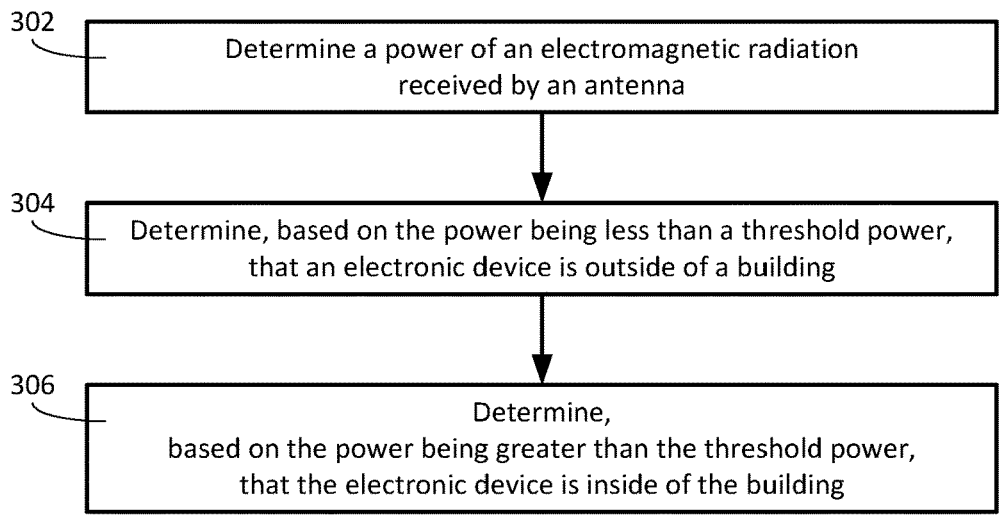
FIG. 3 is a flow diagram of a second example of a method for controlling an impedance matching circuitry based on the location of the electronic device, according to the disclosed technologies.

FIG. 3 is a flow diagram of a second example of a method for controlling an impedance matching circuitry based on the location of the electronic device, according to the disclosed technologies.

In the method 300, at an operation 302, a power of an electromagnetic radiation received by the first antenna can be determined.

At an operation 304, based on the power being less than a threshold power, the location of the electronic device can be determined to be outside of the building.

At an operation 306, based on the power being greater than the threshold power, the location of the electronic device can be determined to be inside of the building.

Figure 4:
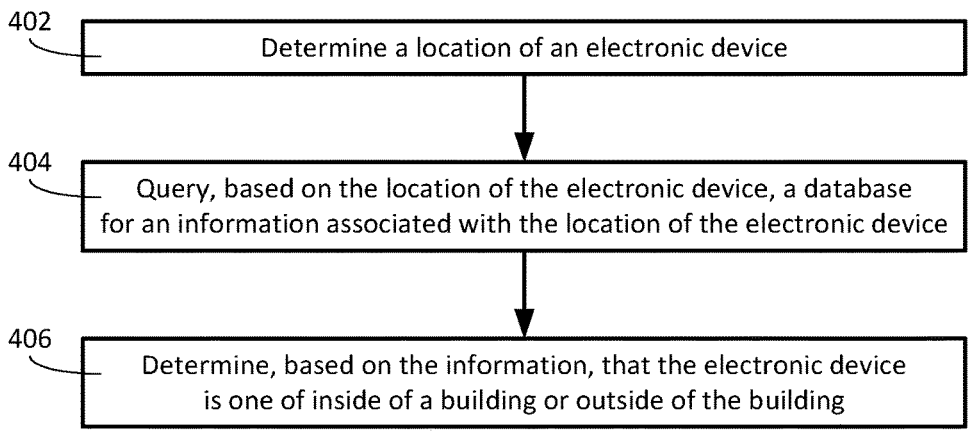
FIG. 4 is a flow diagram of a third example of a method for controlling an impedance matching circuitry based on the location of the electronic device, according to the disclosed technologies.

FIG. 4 is a flow diagram of a third example of a method for controlling an impedance matching circuitry based on the location of the electronic device, according to the disclosed technologies.

In the method 400, at an operation 402, the location of the electronic device can be determined.

At an operation 404, based on the location of the electronic device, a database can be queried for an information associated with the location of the electronic device. The information can be different from the location of the electronic device.

At an operation 406, based on the information, the electronic device can be determined to be one of inside of the building or outside of the building. For example, a perimeter of the building can be defined by a geo-fence.

Figure 5:
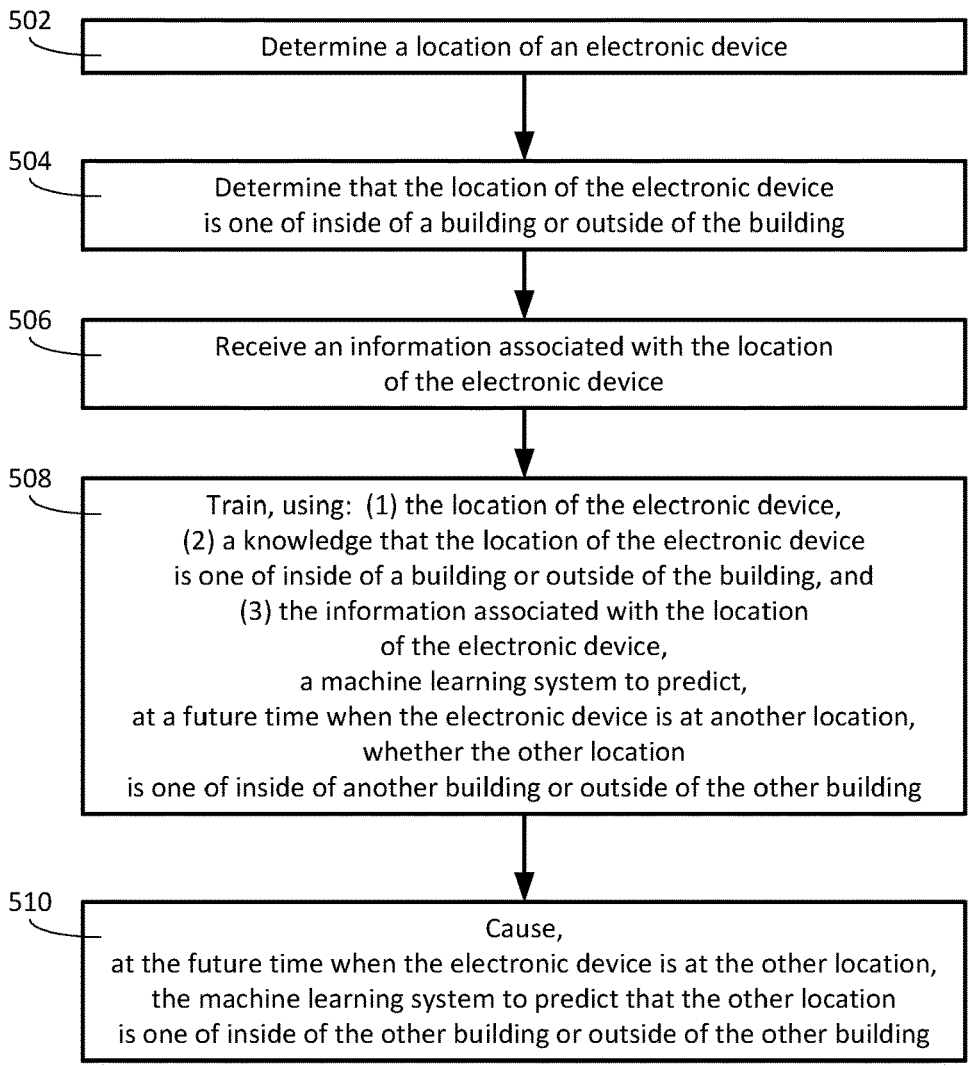
FIG. 5 is a flow diagram of a fourth example of a method for controlling an impedance matching circuitry based on the location of the electronic device, according to the disclosed technologies.

FIG. 5 is a flow diagram of a fourth example of a method for controlling an impedance matching circuitry based on the location of the electronic device, according to the disclosed technologies.

In the method 500, at an operation 502, the location of the electronic device can be determined.

At an operation 504, the location of the electronic device can be determined to be one of inside of the building or outside of the building.

At an operation 506, an information associated with the location of the electronic device can be received. The information can be different from the location of the electronic device.

At an operation 508, using: (1) the location of the electronic device, (2) a knowledge that the location of the electronic device is one of inside of the building or outside of the building, (3) and the information associated with the location of the electronic device, a machine learning system can be trained to predict, at a future time when the electronic device is at another location, whether the other location is one of inside of another building or outside of the other building.

At an operation 510, at the future time when the electronic device is at the other location, the machine learning system can be caused to predict that the other location is one of inside of the other building or outside of the other building.

Figure 6:
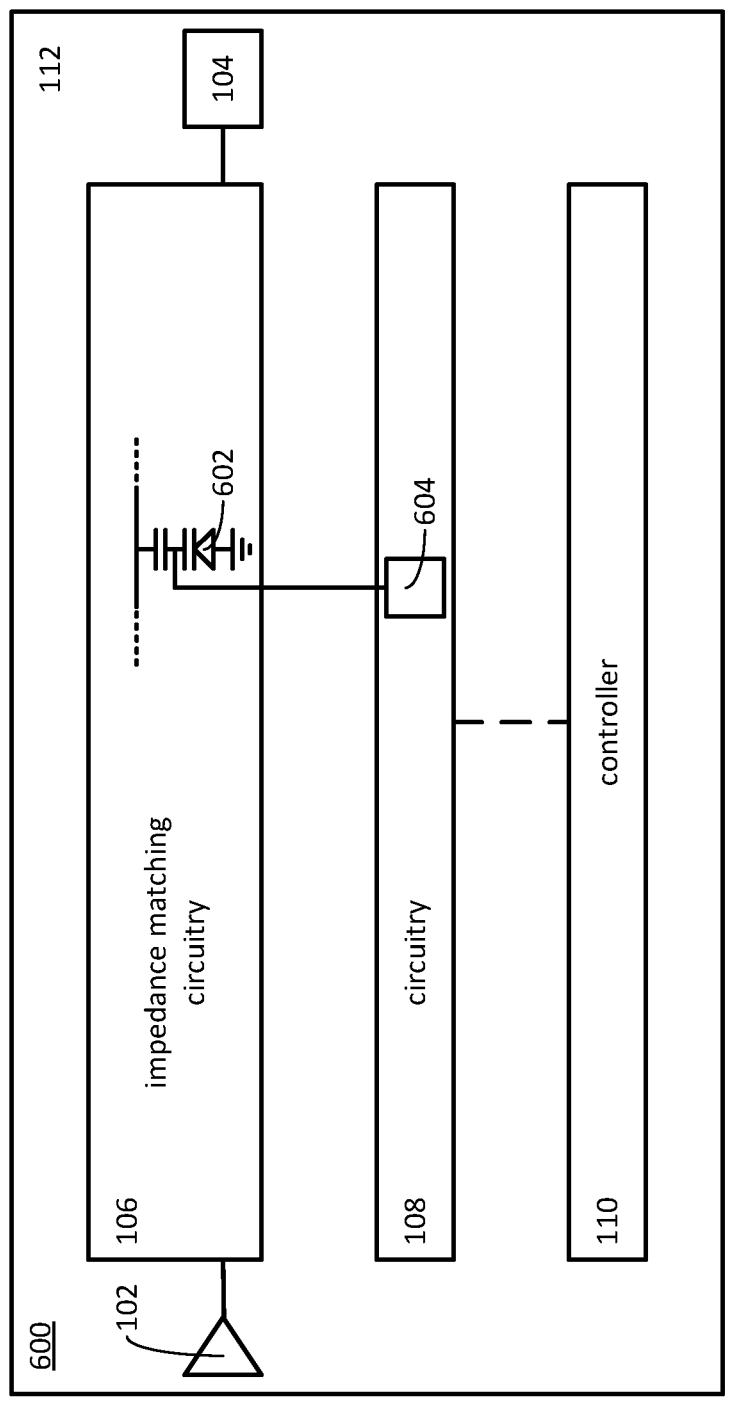
FIG. 6 is a block diagram of a second example of a system for controlling an impedance matching circuitry, according to the disclosed technologies.

FIG. 6 is a block diagram of a second example of a system for controlling an impedance matching circuitry, according to the disclosed technologies. In the system 600, the first impedance matching circuitry 106 can include a tunable reactance device 602. The tunable reactance device 602 can include, for example, a varactor, a tunable dielectric capacitor, a varicap diode, a varactor diode, a variable capacitance diode, a variable reactance diode, a tuning diode, or the like. The first circuitry 108 can include a circuitry 604 configured to provide a bias voltage for the tunable reactance device 602. The controller 110 can be configured to control the first circuitry 108 to set the bias voltage to a specific bias voltage value so that the impedance of the first impedance matching circuitry 106 is set to a specific impedance value.

Figure 7:
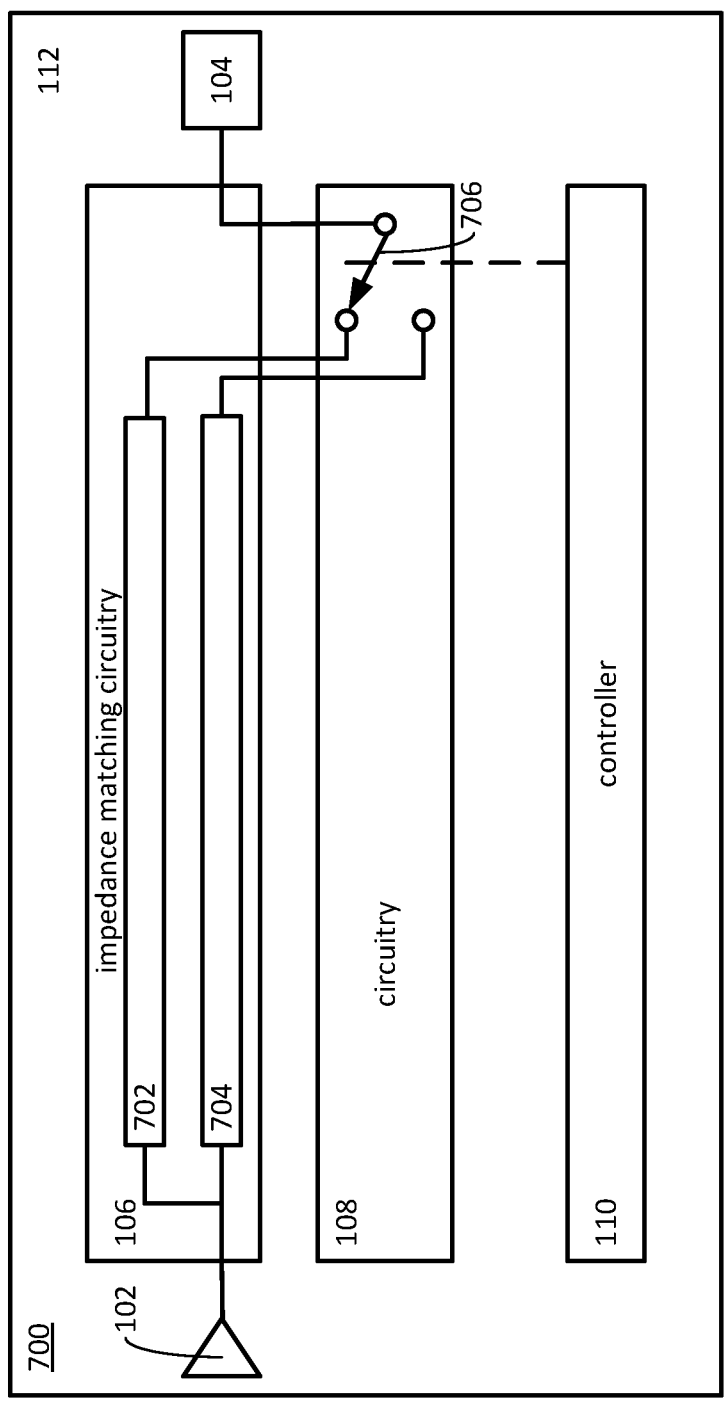
FIG. 7 is a block diagram of a third example of a system for controlling an impedance matching circuitry, according to the disclosed technologies.

FIG. 7 is a block diagram of a third example of a system for controlling an impedance matching circuitry, according to the disclosed technologies. In the system 700, the first impedance matching circuitry 106 can include a first portion 702 of the first impedance matching circuitry 106 and a second portion 704 of the first impedance matching circuitry 106. The first circuitry 108 can include a first switch 706 configured to selectively couple the first antenna 102 to the first receiving or transmitting circuitry 104 via one or more of the first portion 702 of the first impedance matching circuitry 106 or the second portion 704 of the first impedance matching circuitry 106. The first switch 706 can be configured to be coupled between the first receiving or transmitting circuitry 104 and: (1) the first portion 702 of the first impedance matching circuitry 106, (2) the second portion 704 of the first impedance matching circuitry 106, or (3) both. The controller 110 can be configured to control the first circuitry 108 to control a position of the first switch 706.

The first switch 706 can include, for example, one or more of a relay, a microelectromechanical (MEMS) switch, a triac, a transistor, or the like. If the first switch 706 includes a transistor, then the transistor can be, for example, one or more of a bipolar junction transistor (BJT), a junction gate field-effect transistor (JFET), a metal-oxide-semiconductor field-effect transistor (MOSFET), or the like. If the first switch 706 includes a MOSFET, then the MOSFET can be, for example, one or more of a p-channel metal-oxide-semiconductor field-effect transistor (PMOSFET), an n-channel metal-oxide-semiconductor field-effect transistor (NMOSFET), or a complementary metal-oxide-semiconductor field-effect transistor switch (CMOS switch).

Figure 8:
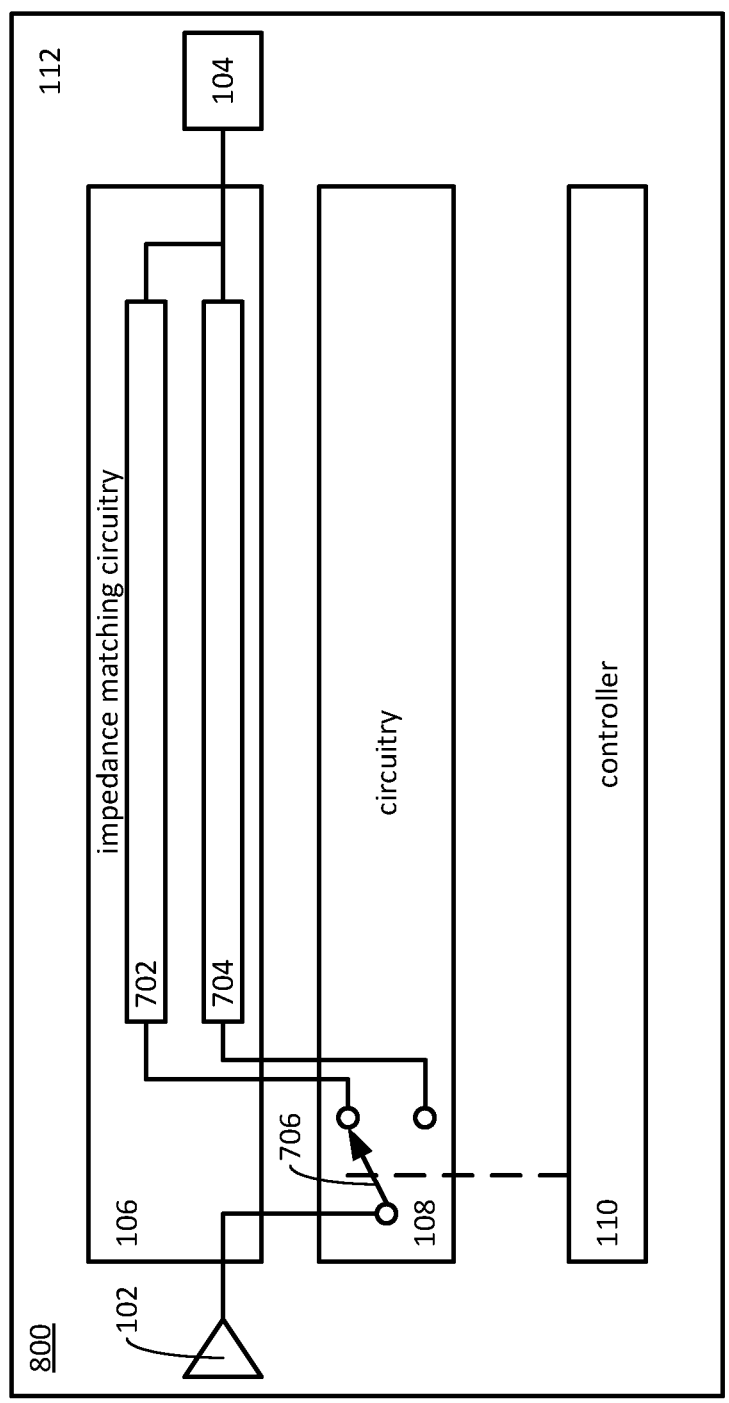
FIG. 8 is a block diagram of a fourth example of a system for controlling an impedance matching circuitry, according to the disclosed technologies.

FIG. 8 is a block diagram of a fourth example of a system for controlling an impedance matching circuitry, according to the disclosed technologies. In the system 800, the first impedance matching circuitry 106 can include the first portion 702 of the first impedance matching circuitry 106 and the second portion 704 of the first impedance matching circuitry 106. The first circuitry 108 can include the first switch 706 configured to selectively couple the first antenna 102 to the first receiving or transmitting circuitry 104 via one or more of the first portion 702 of the first impedance matching circuitry 106 or the second portion 704 of the first impedance matching circuitry 106. The first switch 706 can be configured to be coupled between the first antenna 102 and: (1) the first portion 702 of the first impedance matching circuitry 106, (2) the second portion 704 of the first impedance matching circuitry 106, or (3) both. The controller 110 can be configured to control the first circuitry 108 to control the position of the first switch 706.

Figure 9:
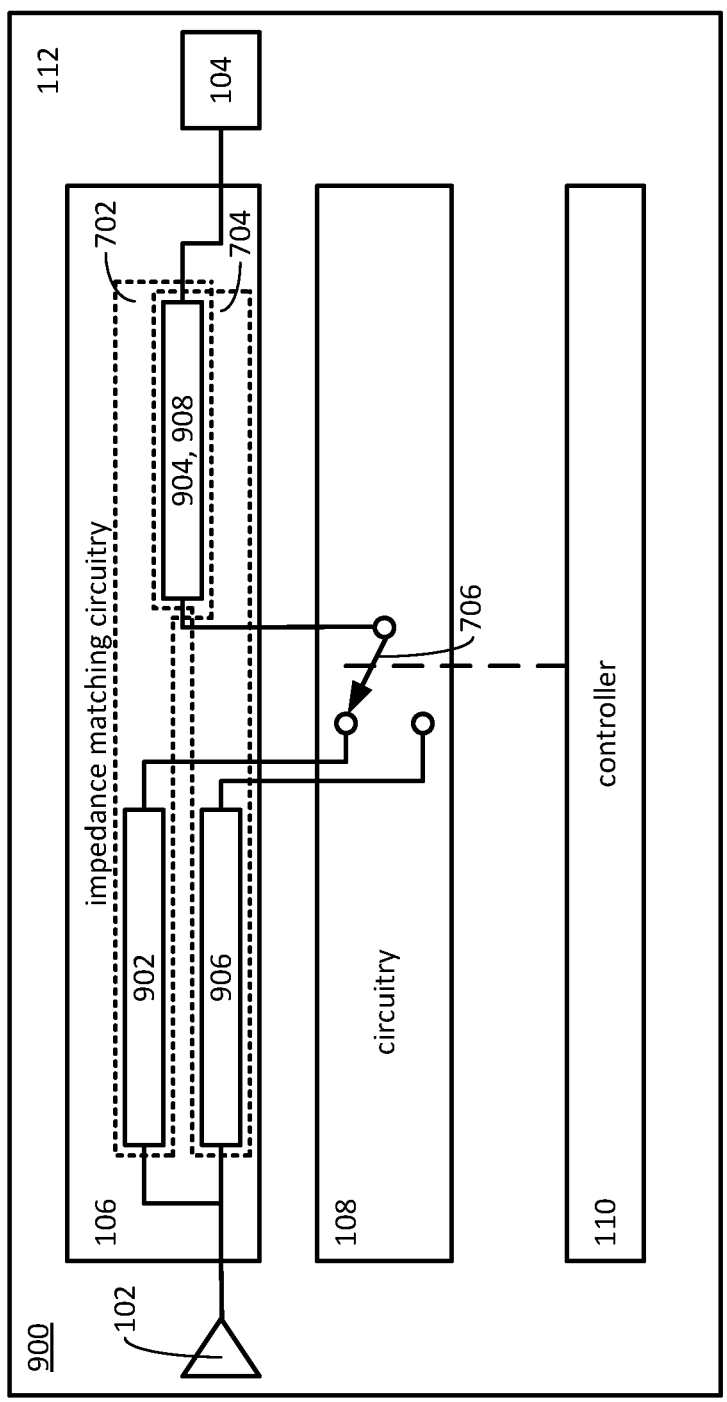
FIG. 9 is a block diagram of a fifth example of a system for controlling an impedance matching circuitry, according to the disclosed technologies.

FIG. 9 is a block diagram of a fifth example of a system for controlling an impedance matching circuitry, according to the disclosed technologies. In the system 900, the first impedance matching circuitry 106 can include the first portion 702 of the first impedance matching circuitry 106 and the second portion 704 of the first impedance matching circuitry 106. The first portion 702 of the first impedance matching circuitry 106 can include a first sub-portion 902 of the first portion 702 of the first impedance matching circuitry 106 and a second sub-portion 904 of the first portion 702 of the first impedance matching circuitry 106. The second portion 704 of the first impedance matching circuitry 106 can include a first sub-portion 906 of the second portion 704 of the first impedance matching circuitry 106 and a second sub-portion 908 of the second portion 704 of the first impedance matching circuitry 106. For example, the second sub-portion 904 of the first portion 702 of the first impedance matching circuitry 106 can be the second sub-portion 908 of the second portion 704 of the first impedance matching circuitry 106. Alternatively, for example, the first sub-portion 902 of the first portion 702 of the first impedance matching circuit 106 and the first sub-portion 906 of the second portion 704 of the first impedance matching circuit 106 (not illustrated). The first circuitry 108 can include the first switch 706 configured to selectively couple the first antenna 102 to the first receiving or transmitting circuitry 104 via one or more of the first portion 702 of the first impedance matching circuitry 106 or the second portion 704 of the first impedance matching circuitry 106. The first switch 706 can be configured to be coupled between the first sub-portion 902 of the first portion 702 of the first impedance matching circuitry 106 and the second sub-portion 904 of the first portion 702 of the first impedance matching circuitry 106. Additionally or alternatively, the first switch 706 can be configured to be coupled between the first sub-portion 906 of the second portion 704 of the first impedance matching circuitry 106 and the second sub-portion 908 of the second portion 704 of the first impedance matching circuitry 106.

Figure 10:
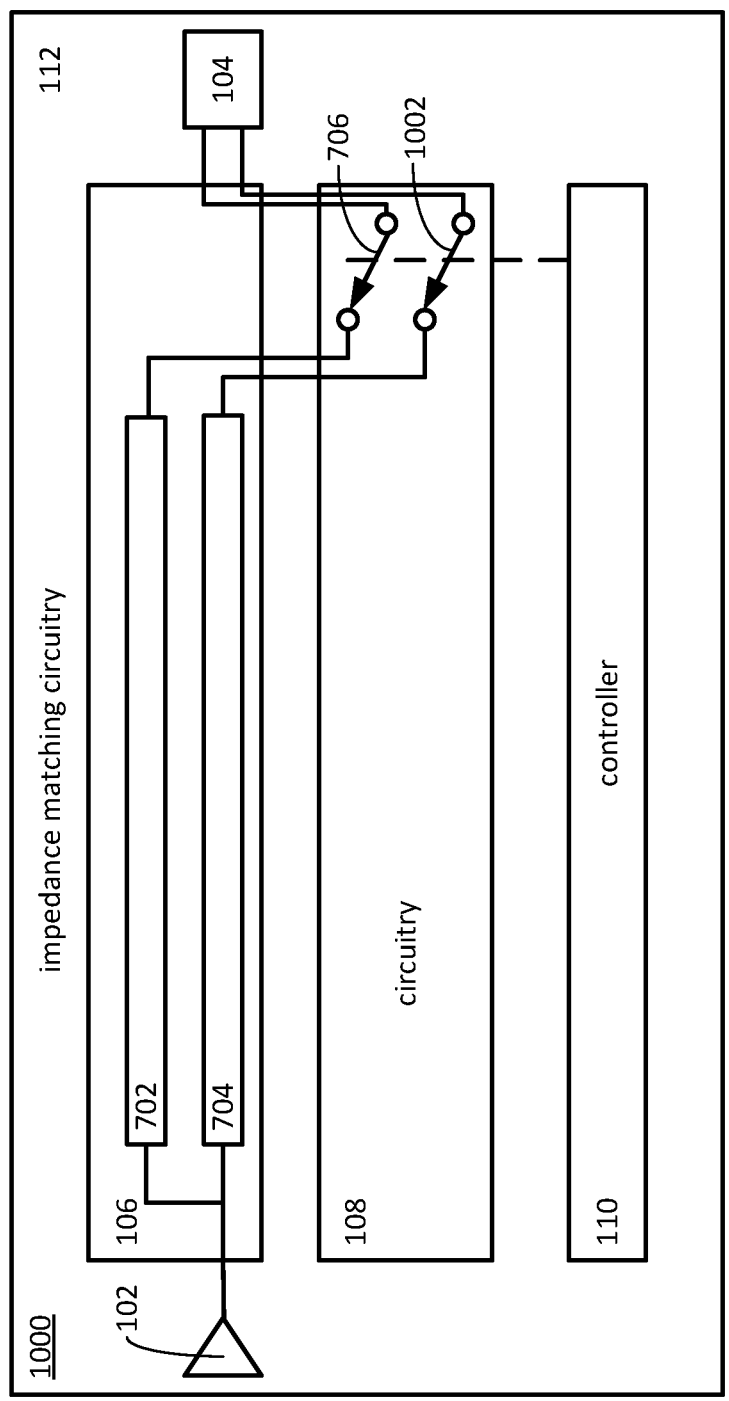
FIG. 10 is a block diagram of a sixth example of a system for controlling an impedance matching circuitry, according to the disclosed technologies.

FIG. 10 is a block diagram of a sixth example of a system for controlling an impedance matching circuitry, according to the disclosed technologies. In the system 1000, the first switch 706 can be configured to selectively couple the first antenna 102 to the first receiving or transmitting circuitry 104 via the first portion 702 of the first impedance matching circuitry 106. The first circuitry 108 can further include a second switch 1002 configured to selectively couple the first antenna 102 to the first receiving or transmitting circuitry 104 via the second portion 704 of the first impedance matching circuitry 106. The controller 110 can be further configured to control the first circuitry 108 to control a position of the second switch 1002.

Figure 11:
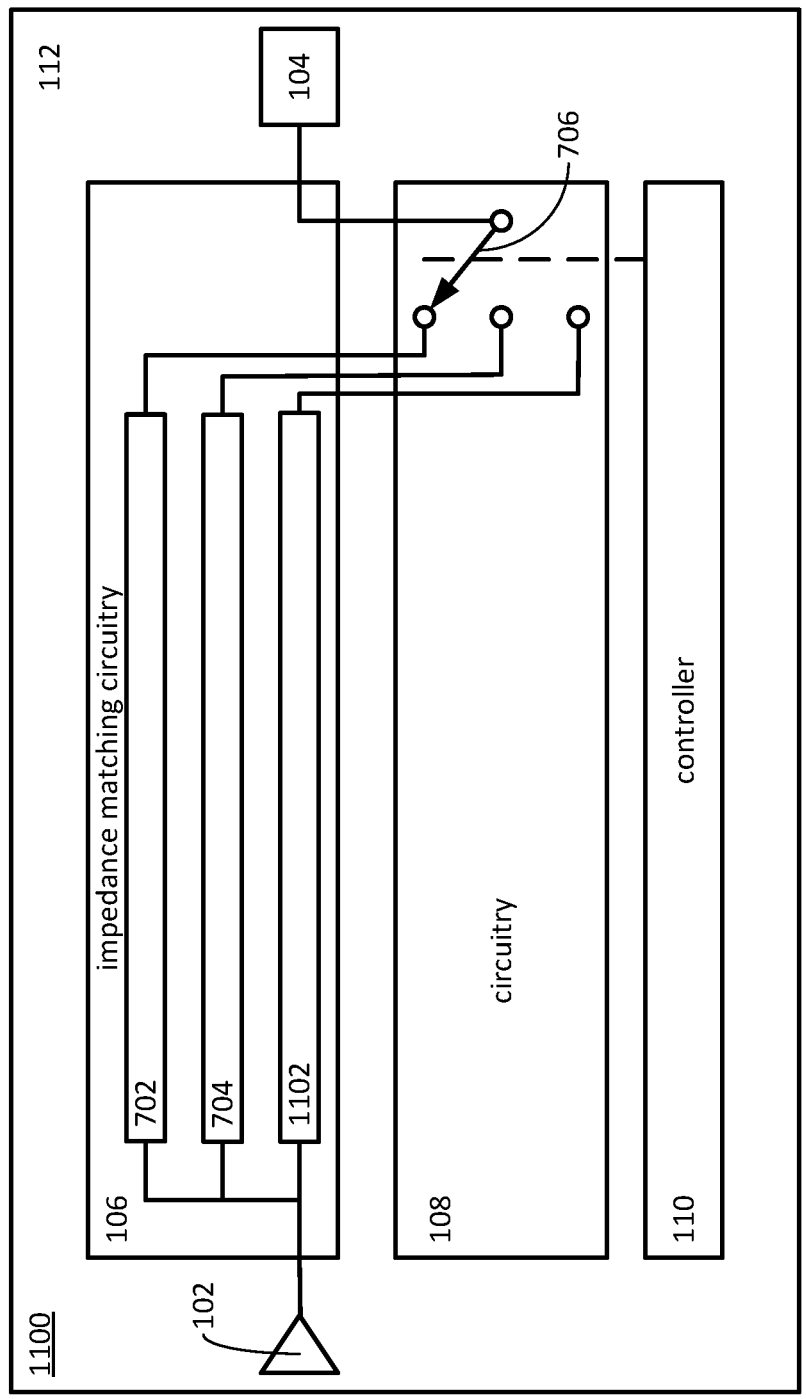
FIG. 11 is a block diagram of a seventh example of a system for controlling an impedance matching circuitry, according to the disclosed technologies.

FIG. 11 is a block diagram of a seventh example of a system for controlling an impedance matching circuitry, according to the disclosed technologies. In the system 1100, the first impedance matching circuitry 106 can further include a third portion 1102 of the first impedance matching circuitry 106. The first switch 706 can be configured to selectively couple the first antenna 102 to the first receiving or transmitting circuitry 104 via one or more of the first portion 702 of the first impedance matching circuitry 106, the second portion 704 of the first impedance matching circuitry 106, or the third portion 1102 of the first impedance matching circuitry 106.

A diversity scheme can be a technique used to improve a reliability of a communication of a signal propagated through space as a radio wave. Such a signal can be susceptible to fading, co-channel interference, or both. The diversity scheme can provide for multiple versions of the signal to be communicated through multiple channels. So, for example, if one version of the signal is communicated through a channel that experiences a high degree of fading, but another version of the signal is communicated through a channel that does not experience a high degree of fading, then a combination of the multiple versions of the signal by an electronic device can improve the reliability of the communication of the signal. The diversity scheme can include, for example, multiple antennas to transmit and/or receive the multiple versions of the signal.

Figure 12:
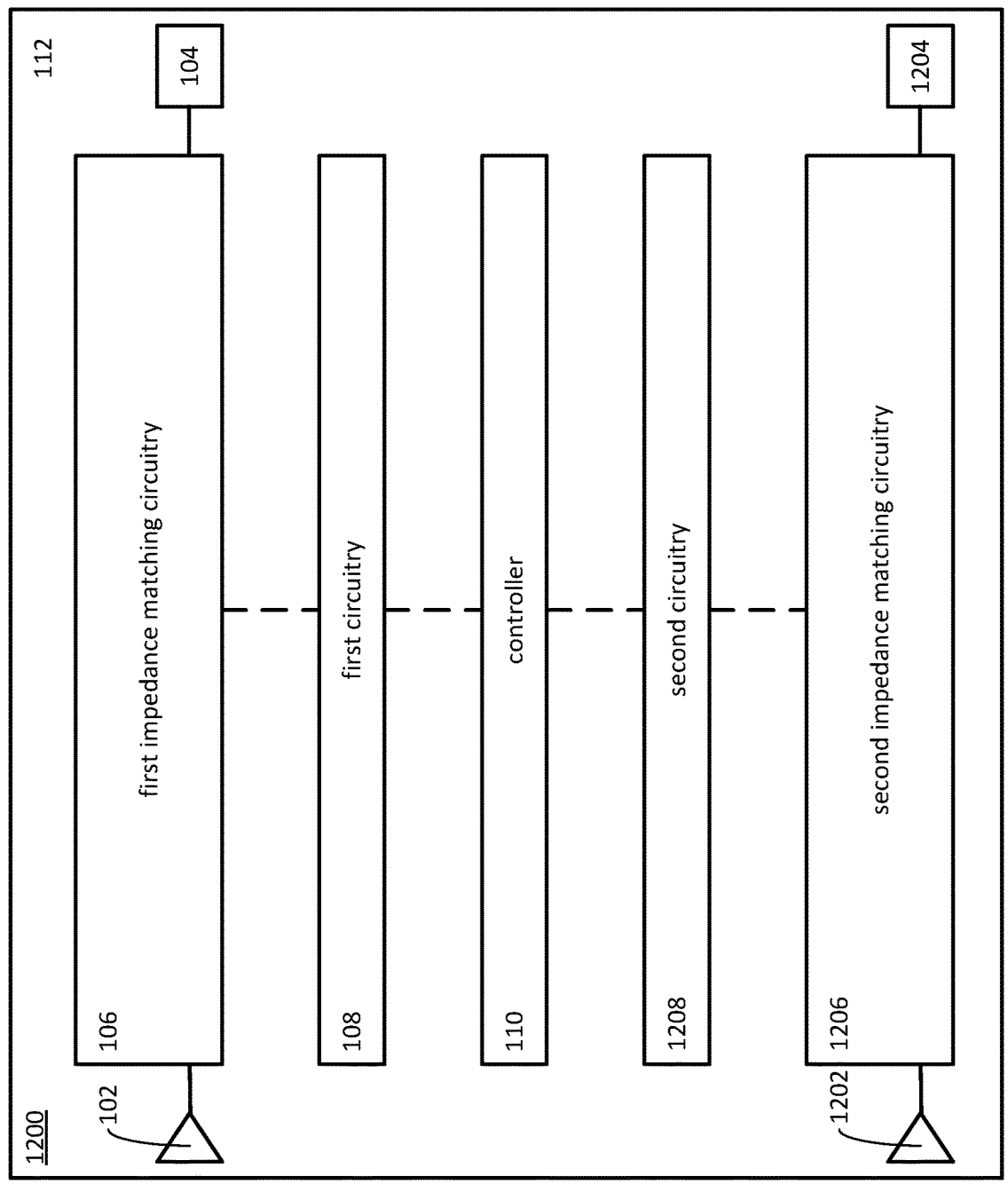
FIG. 12 is a block diagram of an eighth example of a system for controlling an impedance matching circuitry, according to the disclosed technologies.

FIG. 12 is a block diagram of an eighth example of a system for controlling an impedance matching circuitry, according to the disclosed technologies. The system 1200 can include, for example, the first antenna 102, the first receiving or transmitting circuitry 104, the first impedance matching circuitry 106, the first circuitry 108, the controller 110, a second antenna 1202, a second receiving or transmitting circuitry 1204, a second impedance matching circuitry 1206, and a second circuitry 1208. The second impedance matching circuitry 1206 can be coupled between the second antenna 1202 and the second receiving or transmitting circuitry 1204. The second circuitry 1208 can be configured to set a value of an impedance of the second impedance matching circuitry 1206. The controller 110 can be further configured to control, in response to the determination of the state of the electronic device 112, the second circuitry 1208.

In an example: (1) the first antenna 102 can be associated with a first version of the one or more of the satellite radio navigation signal at the first frequency, the satellite radio navigation signal at the second frequency, the wireless local area network signal at the third frequency, the wireless local area network signal at the fourth frequency, the personal area network signal at the fifth frequency, or the personal area network signal at the sixth frequency and (2) the second antenna 1202 can be associated with a second version of the one or more of the satellite radio navigation signal at the first frequency, the satellite radio navigation signal at the second frequency, the wireless local area network signal at the third frequency, the wireless local area network signal at the fourth frequency, the personal area network signal at the fifth frequency, or the personal area network signal at the sixth frequency.

Figure 13A:
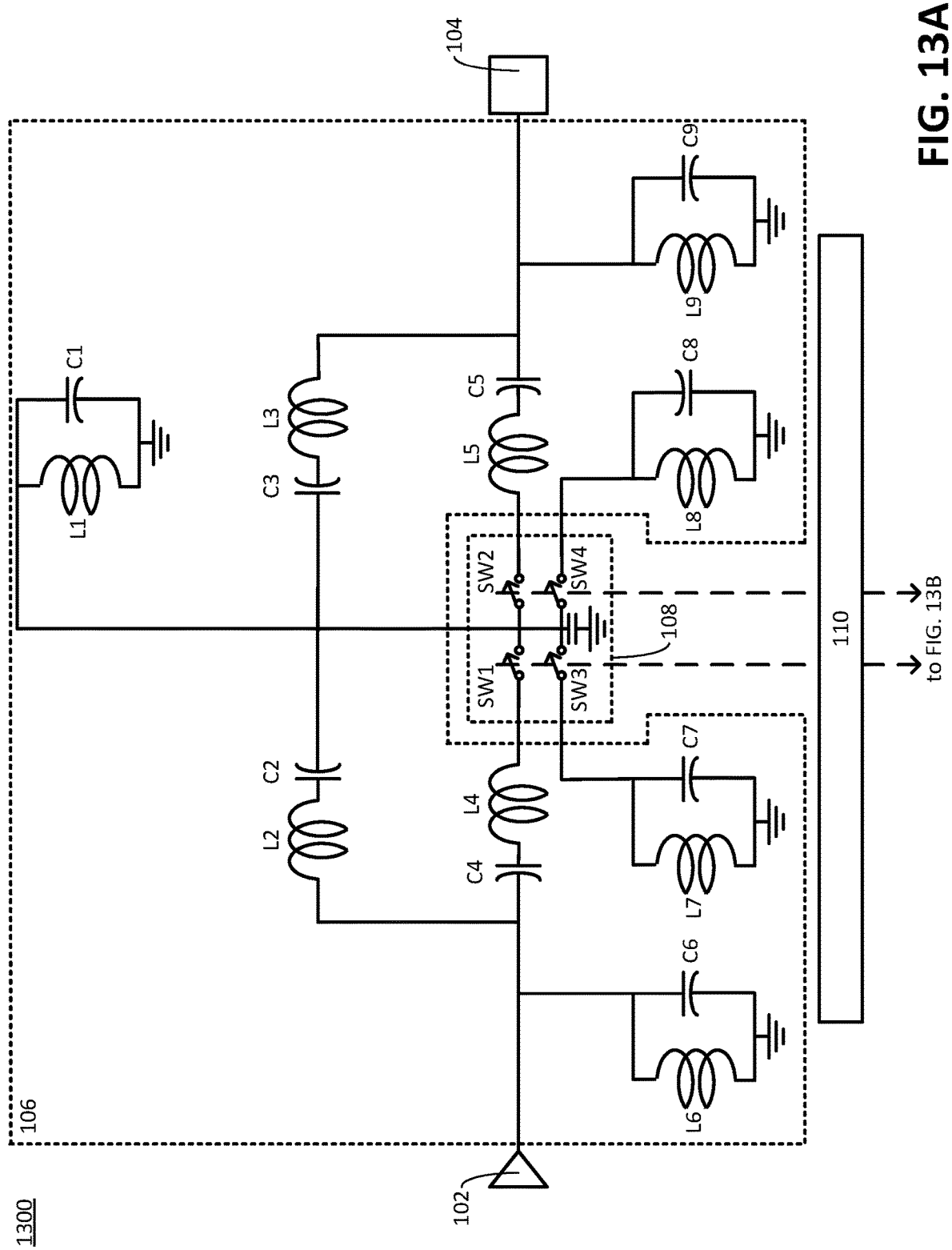
FIGS. 13A and 13B are a block diagram of a ninth example of a system for controlling an impedance matching circuitry, according to the disclosed technologies.
Figure 13B:
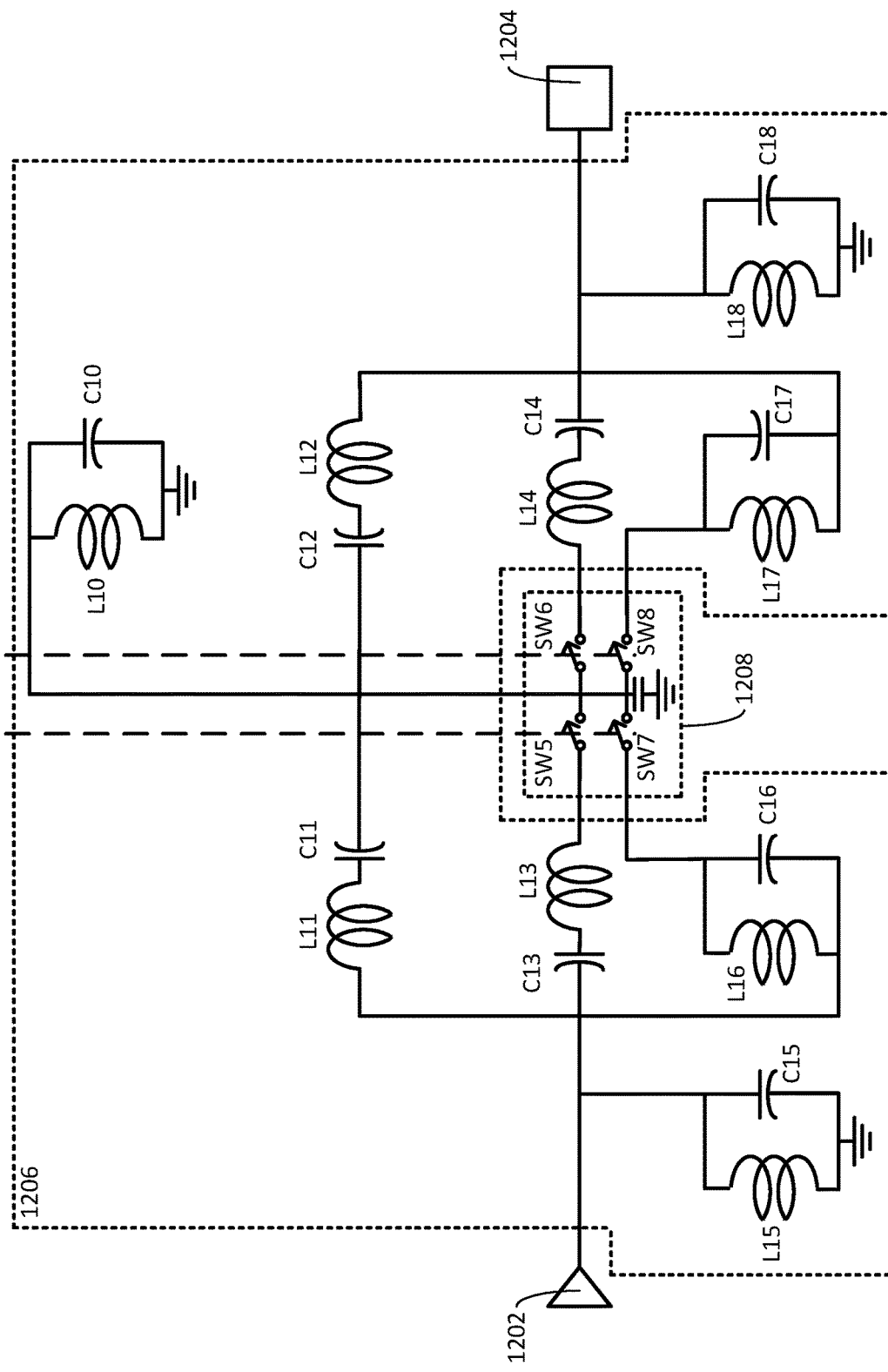

FIGS. 13A and 13B are a block diagram of a ninth example of a system for controlling an impedance matching circuitry, according to the disclosed technologies. The system 1300 can include, for example, the first antenna 102, the first receiving or transmitting circuitry 104, the first impedance matching circuitry 106, the first circuitry 108, the controller 110, the second antenna 1202, the second receiving or transmitting circuitry 1204, the second impedance matching circuitry 1206, and the second circuitry 1208. The first circuitry 108 can include a first single pole, quadruple throw switch, which can include a first switch SW1, a second switch SW2, a third switch SW3, and a fourth switch SW4. The second circuitry 1208 can include a second single pole, quadruple throw switch, which can include a fifth switch SW5, a sixth switch SW6, a seventh switch SW7, and an eighth switch SW8. For example, the first circuitry 108, the second circuitry 1208, or each can be Part No. QAT3516 designed by Qualcomm Incorporated of San Diego, California. The first circuitry 108 can be configured to selectively couple one or more inductors and/or one or more capacitors between one or more of: (1) the first antenna 102 and the first receiving or transmitting circuitry 104, (2) the first antenna 102 and electrical ground, or (3) the first receiving or transmitting circuitry 104 and electrical ground. The second circuitry 1208 can be configured to selectively couple one or more inductors and/or one or more capacitors between one or more of: (1) the second antenna 1202 and the second receiving or transmitting circuitry 1204, (2) the second antenna 1202 and electrical ground, or (3) the second receiving or transmitting circuitry 1204 and electrical ground. For example, values of the one or more inductors and/or the one or more capacitors can be optimized using electronic circuit simulation software so that only those passive devices (illustrated in FIGS. 13A and 13B) that improve matching performance are included in the physical design of the system 1300.

In an example, the state of the electronic device 112 can be a first state, a second state, a third state, or a fourth state. In the first state, the electronic device 112 can be configured to perform: (1) via the first antenna 102, the one or more functions with: (a) the satellite radio navigation signal at 1176.45 MHz, (b) a first version of the wireless local area network signal at 5 GHz, and (c) a first version of the wireless local area network signal at 2.4 GHz or a first version of the personal area network signal at 2.4 GHz and (2) via the second antenna 1202, the one or more functions with: (a) the satellite radio navigation signal at 1575.42 MHz, (b) a second version of the wireless local area network signal at 5 GHz, and (c) a second version of the wireless local area network signal at 2.4 GHz or a second version of the personal area network signal at 2.4 GHz. For example, the first state can be a default state into which the electronic device 112 is placed when the electronic device 112 is placed into an operational state. In the second state, the electronic device 112 can be configured to perform: (1) via the first antenna 102, the one or more functions with the satellite radio navigation signal at 1176.45 MHz and (2) via the second antenna 1202, the one or more functions with the satellite radio navigation signal at 1575.42 MHz. For example, the second state can be a state into which the electronic device 112 is placed in response to a determination that the electronic device 112 is outside of a building. In the third state, the electronic device 112 can be configured to perform: (1) via the first antenna 102, the one or more functions with: (a) the first version of the wireless local area network signal at 5 GHz and (b) the first version of the wireless local area network signal at 2.4 GHz or the first version of the personal area network signal at 2.4 GHz and (2) via the second antenna 1202, the one or more functions with: (a) the second version of the wireless local area network signal at 5 GHz and (b) the second version of the wireless local area network signal at 2.4 GHz or the second version of the personal area network signal at 2.4 GHz. For example, the third state can be a state into which the electronic device 112 is placed in response to a determination that the electronic device 112 is inside of a building. In the fourth state, the electronic device 112 can be configured to perform: (1) via the first antenna 102, the one or more functions with: (a) the satellite radio navigation signal at 1176.45 MHz and (b) the first version of the wireless local area network signal at 2.4 GHz or the first version of the personal area network signal at 2.4 GHz and (2) via the second antenna 1202, the one or mere functions with: (a) the satellite radio navigation signal at 1575.42 MHz and (b) the second version of the wireless local area network signal at 2.4 GHz or the second version of the personal area network signal at 2.4 GHz. For example, the fourth state can be a state into which the electronic device 112 is placed in response to a determination that: (1) the electronic device 112 is outside of a building and (2) the electronic device 112 is being used to convey the personal area network signal.

FIG. 14 is a table of an example of values of passive devices included in the system 1300 for controlling an impedance matching circuitry, according to the disclosed technologies. In this table, an indication that a device is "not used" means that this device is replaced with an open circuit, while an indication that a value of a device is "0 Ohms" means that this device is replaced with a short circuit.

FIG. 15 is a table of an example of positions of switches as functions of states included in the system 1300 for controlling an impedance matching circuitry, according to the disclosed technologies.

In general, in light of the technologies described above, one of skill in the art understands that systems for controlling an impedance matching circuitry can include any combination of some or all of the foregoing configurations.

Figure 16:
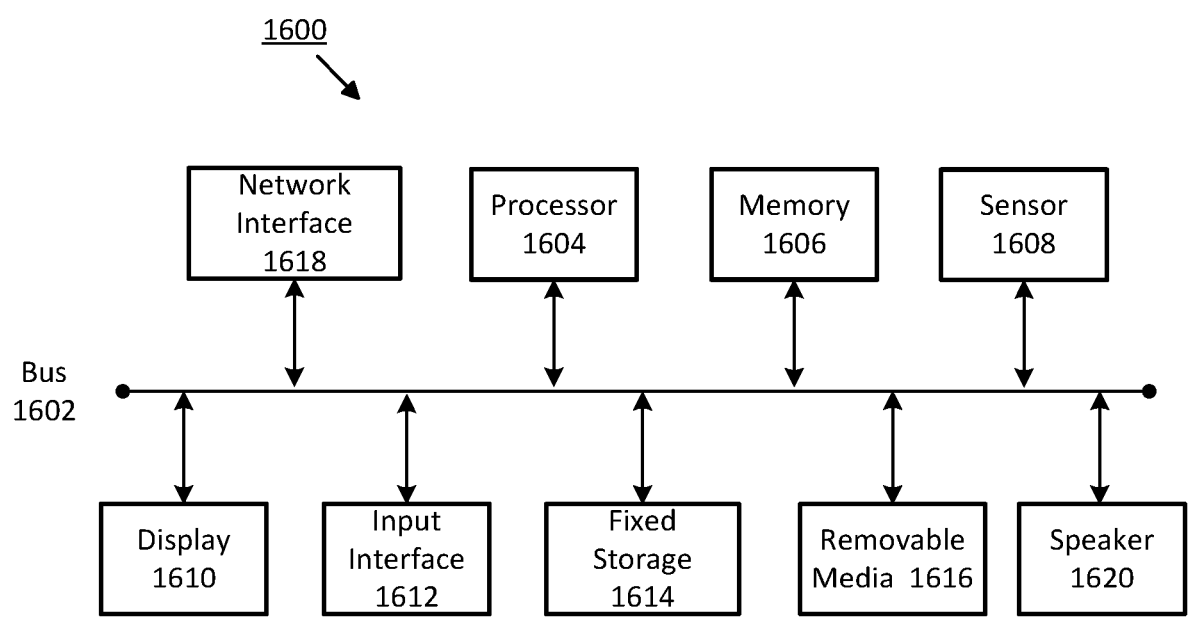
FIG. 16 is a block diagram of an example of an electronic device suitable for implementing the disclosed technologies.

FIG. 16 is a block diagram of an example of an electronic device 1600 suitable for implementing the disclosed technologies. The electronic device 1600 can be used to implement, for example, the electronic device 112 as described above.

The electronic device 1600 can include a bus 1602 that interconnects major components of the electronic device 1600. Such components can include a central processor 1604; a memory 1606 (such as Random Access Memory (RAM), Read-Only Memory (ROM), flash RAM, or the like), a sensor 1608 (which can include one or more sensors), a display 1610 (such as a display screen), an input interface 1612 (which can include one or more input devices such as a keyboard, mouse, keypad, touch pad, turn-wheel, and the like), a fixed storage 1614 (such as a hard drive, flash storage, and the like), a removable media component 1616 (operable to control and receive a solid-state memory device, an optical disk, a flash drive, and the like), a network interface 1618 (operable to communicate with one or more remote devices via a suitable network connection), and a speaker 1620 (to output an audible communication). In some embodiments the input interface 1612 and the display 1610 can be combined, such as in the form of a touch screen.

The bus 1602 can allow data communication between the central processor 1604 and one or more memory components 1614, 1616, which can include RAM, ROM, or other memory. Applications resident with the electronic device 1600 generally can be stored on and accessed via a computer readable storage medium.

The central processor 1604 can be in communication with the controller 110. Alternatively, the controller 110 can include the central processor 1604.

The fixed storage 1614 can be integral with the electronic device 1600 or can be separate and accessed through other interfaces. The network interface 1618 can provide a direct connection to the premises management system and/or a remote server via a wired or wireless connection. The network interface 1618 can provide such connection using any suitable technique and protocol, including digital cellular telephone, WiFi™, Thread®, Bluetooth®, near field communications (NFC), and the like. For example, the network interface 1618 can allow the electronic device 1600 to communicate with other computers via one or more local, wide-area, or other communication networks.

FIG. 17 is a flow diagram of an example of a method for controlling an impedance matching circuitry, according to the disclosed technologies.

In the method 1700, at an operation 1702, a processor can determine, based on a state of an electronic device, that the electronic device is configured to perform one or more functions with one or more of a satellite radio navigation signal at a first frequency, a satellite radio navigation signal at a second frequency, a wireless local area network signal at a third frequency, a wireless local area network signal at a fourth frequency, a personal area network signal at a fifth frequency, or a personal area network signal at a sixth frequency. For example, the personal area network signal can have an effective maximum range of about one hundred meters.

At an operation 1704, the processor can control, in response to a determination of the state of the electronic device, a circuitry configured to set a value of an impedance of an impedance matching circuitry coupled between an antenna and a receiving or transmitting circuitry.

The foregoing description, for purpose of explanation, has been described with reference to specific configurations. However, the illustrative descriptions above are not intended to be exhaustive or to limit configurations of the disclosed technologies to the precise forms disclosed. Many modifications and variations are possible in view of the above teachings. The configurations were chosen and described in order to explain the principles of configurations of the disclosed technologies and their practical applications, to thereby enable others skilled in the art to utilize those configurations as well as various configurations with various modifications as may be suited to the particular use contemplated.

Implementations disclosed herein can include systems, devices, arrangements, techniques, and compositions such as the following:

1. A mobile communication device comprising:
   a wireless local area network (WLAN) transceiver;
   a satellite global positioning system (GPS) receiver;
   a first antenna;
   a first switchable impedance matching circuit coupled between the first antenna and the WLAN transceiver and the GPS receiver; and
   a controller configured to:
     determine a state of the mobile communication device, the state being one of various states, the various states including an indoor state and an outdoor state;
     set, based on the mobile communication device being in the indoor state, the first switchable impedance matching circuitry to a state for the first antenna to communicate a WLAN signal in a WLAN frequency band; and
     set, based on the mobile communication device being in the outdoor state, the first switchable impedance matching circuitry to a state for the first antenna to communicate a GPS signal in a GPS frequency band.

2. The mobile communication device of implementation 1, wherein the first switchable impedance matching circuitry includes a tunable reactance device.

3. The mobile communication device of implementation 2, wherein the tunable reactance device comprises at least one of a varactor, a tunable dielectric capacitor, a varicap diode, a varactor diode, a variable capacitance diode, a variable reactance diode, or a tuning diode.

4. The mobile communication device of implementation 1, wherein the first switchable impedance matching circuitry includes a switch.

5. The mobile communication device of implementation 4, wherein the switch comprises a complementary metal-oxide-semiconductor field-effect transistor switch.

6. The mobile communication device of implementation 4, wherein the switch comprises a single pole, quadruple throw switch.

7. The mobile communication device of implementation 1, 2, 3, 4, 5, or 6, wherein the various states further include at least one of a state defined by a time, a state defined by a frequency of an electromagnetic radiation received at the first antenna, a state of the mobile communication device being charged, a state of the mobile communication device having a cable connected to the mobile communication device, a state of the mobile communication device being used to operate a specific application, a state of the mobile communication device being used to convey a personal area network signal, a state of the mobile communication device being used to present at least one of video information or audio information, a state of the mobile communication device being in proximity to another object, a state defined by a measure of a reflection coefficient or impedance of the first antenna, or a state defined by an orientation of the mobile communication device.

8. The mobile communication device of implementation 1, 2, 3, 4, 5, 6, or 7, further comprising:
   a second antenna; and
   a second switchable impedance matching circuit coupled between the second antenna and the WLAN transceiver and the GPS receiver,
   wherein the controller is further configured to:
     set, based on the mobile communication device being in the indoor state, the second switchable impedance matching circuitry to a state for the second antenna to communicate the WLAN signal in the WLAN frequency band, and set, based on the mobile communication device being in the outdoor state, the second switchable impedance matching circuitry to a state for the second antenna to communicate the GPS signal in the GPS frequency band.

9. The mobile communication device of implementation 8, wherein:
the first antenna is associated with a first version of at least one of the WLAN signal or the GPS signal,
the second antenna is associated with a second version of the at least one of the WLAN signal or the GPS signal, and
the first antenna and the second antenna are configured on the mobile communication device to support a diversity scheme.

10. The mobile communication device of implementation 8, wherein:
the first antenna is associated with the GPS signal at a first frequency, and
the second antenna is associated with the GPS signal at a second frequency.

11. The mobile communication device of implementation 8, wherein a configuration of elements included in the first switchable impedance matching circuitry is different from a configuration of elements included in the second switchable impedance matching circuitry.

12. The mobile communication device of implementation 1, 2, 3, 4, 5, 6, or 7, wherein the mobile communication device is configured to:
determine a location of the mobile communication device;
compare the location of the mobile communication device with a satellite radio navigation coverage map;
determine, based on a result of a comparison of the location of the mobile communication device with the satellite radio navigation coverage map, a power of a satellite radio navigation service at the location of the mobile communication device;
determine, based on the power being less than a threshold power, that the location of the mobile communication device is indoors; and
determine, based on the power being greater than the threshold power, that the location of the mobile communication device is outdoors.

13. The mobile communication device of implementation 1, 2, 3, 4, 5, 6, or 7, wherein the mobile communication device is configured to:
determine a power of an electromagnetic radiation received by the first antenna;
determine, based on the power being less than a threshold power, that a location of the mobile communication device is outdoors; and
determine, based on the power being greater than the threshold power, that the location of the mobile communication device is indoors.

14. The mobile communication device of implementation 1, 2, 3, 4, 5, 6, or 7, wherein the mobile communication device is configured to:
determine a location of the mobile communication device;
query, based on the location of the mobile communication device, a database for an information associated with the location of the mobile communication device, the information being different from the location of the mobile communication device; and
determine, based on the information, that the mobile communication device is one of indoors or outdoors.

15. The mobile communication device of implementation 1, 2, 3, 4, 5, 6, or 7, wherein the mobile communication device is configured to:
determine a location of the mobile communication device;
determine that the location of the mobile communication device is one of indoors or outdoors;
receive an information associated with the location of the mobile communication device, the information being different from the location of the mobile communication device;
train, using the location of the mobile communication device, a knowledge that the location of the mobile communication device is one of indoors or outdoors, and the information associated with the location of the mobile communication device, a machine learning system to predict, at a future time when the mobile communication device is at another location, whether the other location is one of indoors or outdoors; and
cause, at the future time when the mobile communication device is at the other location, the machine learning system to predict that the other location is one of indoors or outdoors.

16. A mobile device comprising:
a wireless local area network (WLAN) transceiver operable in multiple bands;
a satellite global positioning system (GPS) receiver operable in multiple bands;
a first antenna;
a first switchable impedance matching circuit coupled between the first antenna and the WLAN transceiver and the GPS receiver;
a second antenna;
a second switchable impedance matching circuit coupled between the second antenna and the WLAN transceiver and the GPS receiver;
a controller configured to switch at least one of the first switchable impedance matching circuit or the second switchable impedance matching circuit to set a circuitry state of the mobile device, the circuitry state being one of various states, the various states including:
a first state in which the first antenna is configured to communicate one of:
a GPS signal in a GPS frequency band, and
a WLAN signal in a WLAN frequency band, and
a second state in which:
the first antenna is configured to communicate more than one of:
the GPS signal in the GPS frequency band, and
the WLAN signal in the WLAN frequency band, and
the second antenna is configured to communicate the WLAN signal in the WLAN frequency band.

17. The mobile communication device according to implementation 16, further comprising a personal area network (PAN) transceiver, wherein:
the first switchable impedance matching circuit is coupled between the first antenna and the PAN transceiver,
the second switchable impedance matching circuit is coupled between the second antenna and the PAN transceiver, and the various states include at least one state wherein at least one of the first antenna and the second antenna is configured to communicate PAN signals in a PAN frequency band.

18. The mobile device according to implementation 16 or 17, wherein the controller is further configured to:
detect that the mobile device is in an indoor state or an outdoor state, and
alter, based on the mobile device being in one of the indoor state or the outdoor state, the circuitry state of the mobile device.

19. The mobile device of implementation 17 or 18, wherein:
the GPS frequency band includes a frequency at at least one of 1176.45 MHz or 1575.42 MHz,
the WLAN frequency band includes a frequency at at least one of 2.4 GHz or 5 GHz, and
the PAN frequency band includes a frequency at 2.4 GHz.

20. The mobile device of implementation 15, 16, 17, 18, or 19, wherein a configuration of elements included in the first switchable impedance matching circuitry is different from a configuration of elements included in the second switchable impedance matching circuitry.

The invention claimed is:

1. A mobile communication device comprising:
a wireless local area network (WLAN) transceiver;
a satellite global positioning system (GPS) receiver;
a first antenna;
a second antenna;
a first switchable impedance matching circuit coupled between the first antenna and the WLAN transceiver and the GPS receiver;
a second switchable impedance matching circuit coupled between the second antenna and the WLAN transceiver and the GPS receiver; and
a controller configured to:
determine a state of the mobile communication device, the state being one of various states, the various states including an indoor state and an outdoor state;
set, based on the mobile communication device being in the indoor state, the first switchable impedance matching circuitry to a state for the first antenna to communicate a WLAN signal in a WLAN frequency band and the second switchable impedance matching circuitry to a state for the second antenna to communicate the WLAN signal in the WLAN frequency band; and
set, based on the mobile communication device being in the outdoor state, the first switchable impedance matching circuitry to a state for the first antenna to communicate a GPS signal in a GPS frequency band and the second switchable impedance matching circuitry to a state for the second antenna to communicate the GPS signal in the GPS frequency band.

2. The mobile communication device of claim 1, wherein the first switchable impedance matching circuitry includes a tunable reactance device.

3. The mobile communication device of claim 2, wherein the tunable reactance device comprises at least one of a varactor, a tunable dielectric capacitor, a varicap diode, a varactor diode, a variable capacitance diode, a variable reactance diode, or a tuning diode.

4. The mobile communication device of claim 1, wherein the first switchable impedance matching circuitry includes a switch.

5. The mobile communication device of claim 4, wherein the switch comprises a complementary metal-oxide-semiconductor field-effect transistor switch.

6. The mobile communication device of claim 4, wherein the switch comprises a single pole, quadruple throw switch.

7. The mobile communication device of claim 1, wherein the various states further include at least one of a state defined by a time, a state defined by a frequency of an electromagnetic radiation received at the first antenna, a state of the mobile communication device being charged, a state of the mobile communication device having a cable connected to the mobile communication device, a state of the mobile communication device being used to operate a specific application, a state of the mobile communication device being used to convey a personal area network signal, a state of the mobile communication device being used to present at least one of video information or audio information, a state of the mobile communication device being in proximity to another object, a state defined by a measure of a reflection coefficient or impedance of the first antenna, or a state defined by an orientation of the mobile communication device.

8. The mobile communication device of claim 1, wherein:
the first antenna is associated with a first version of at least one of the WLAN signal or the GPS signal,
the second antenna is associated with a second version of the at least one of the WLAN signal or the GPS signal, and
the first antenna and the second antenna are configured on the mobile communication device to support a diversity scheme.

9. The mobile communication device of claim 1, wherein:
the first antenna is associated with the GPS signal at a first frequency, and
the second antenna is associated with the GPS signal at a second frequency.

10. The mobile communication device of claim 1, wherein a configuration of elements included in the first switchable impedance matching circuitry is different from a configuration of elements included in the second switchable impedance matching circuitry.

11. The mobile communication device of claim 1, wherein the mobile communication device is configured to:
determine a location of the mobile communication device;
compare the location of the mobile communication device with a satellite radio navigation coverage map;
determine, based on a result of a comparison of the location of the mobile communication device with the satellite radio navigation coverage map, a power of a satellite radio navigation service at the location of the mobile communication device;
determine, based on the power being less than a threshold power, that the location of the mobile communication device is indoors; and
determine, based on the power being greater than the threshold power, that the location of the mobile communication device is outdoors.

12. The mobile communication device of claim 1, wherein the mobile communication device is configured to:
determine a power of an electromagnetic radiation received by the first antenna;
determine, based on the power being less than a threshold power, that a location of the mobile communication device is outdoors; and
determine, based on the power being greater than the threshold power, that the location of the mobile communication device is indoors.

13. The mobile communication device of claim 1, wherein the mobile communication device is configured to:
  determine a location of the mobile communication device;
  query, based on the location of the mobile communication device, a database for an information associated with the location of the mobile communication device, the information being different from the location of the mobile communication device; and
  determine, based on the information, that the mobile communication device is one of indoors or outdoors.

14. The mobile communication device of claim 1, wherein the mobile communication device is configured to:
  determine a location of the mobile communication device;
  determine that the location of the mobile communication device is one of indoors or outdoors;
  receive an information associated with the location of the mobile communication device, the information being different from the location of the mobile communication device;
  train, using the location of the mobile communication device, a knowledge that the location of the mobile communication device is one of indoors or outdoors, and the information associated with the location of the mobile communication device, a machine learning system to predict, at a future time when the mobile communication device is at another location, whether the other location is one of indoors or outdoors; and
  cause, at the future time when the mobile communication device is at the other location, the machine learning system to predict that the other location is one of indoors or outdoors.

15. A mobile device comprising:
  a wireless local area network (WLAN) transceiver operable in multiple bands;
  a satellite global positioning system (GPS) receiver operable in multiple bands;
  a first antenna;
  a first switchable impedance matching circuit coupled between the first antenna and the WLAN transceiver and the GPS receiver;
  a second antenna;
  a second switchable impedance matching circuit coupled between the second antenna and the WLAN transceiver and the GPS receiver; and
  a controller configured to switch at least one of the first switchable impedance matching circuit or the second switchable impedance matching circuit to set a circuitry state of the mobile device, the circuitry state being one of various states, the various states including:
    a first state in which the first antenna is configured to communicate one of:
      a GPS signal in a GPS frequency band, and
      a WLAN signal in a WLAN frequency band, and
    a second state in which:
      the first antenna is configured to communicate more than one of:
        the GPS signal in the GPS frequency band, and
        the WLAN signal in the WLAN frequency band, and
      the second antenna is configured to communicate the WLAN signal in the WLAN frequency band.

16. The mobile device according to claim 15, further comprising a personal area network (PAN) transceiver, wherein:
  the first switchable impedance matching circuit is coupled between the first antenna and the PAN transceiver,
  the second switchable impedance matching circuit is coupled between the second antenna and the PAN transceiver, and
  the various states include at least one state wherein at least one of the first antenna and the second antenna is configured to communicate PAN signals in a PAN frequency band.

17. The mobile device according to claim 16, wherein the controller is further configured to:
  detect that the mobile device is in an indoor state or an outdoor state, and
  alter, based on the mobile device being in one of the indoor state or the outdoor state, the circuitry state of the mobile device.

18. The mobile device of claim 16, wherein:
  the GPS frequency band includes a frequency at at least one of 1176.45 MHz or 1575.42 MHz,
  the WLAN frequency band includes a frequency at at least one of 2.4 GHz or 5 GHz, and
  the PAN frequency band includes a frequency at 2.4 GHz.

19. The mobile device of claim 15, wherein a configuration of elements included in the first switchable impedance matching circuitry is different from a configuration of elements included in the second switchable impedance matching circuitry.

20. A mobile communication device comprising:
  a wireless local area network (WLAN) transceiver;
  a satellite global positioning system (GPS) receiver;
  a first antenna;
  a first switchable impedance matching circuit coupled between the first antenna and the WLAN transceiver and the GPS receiver; and
  a controller configured to:
    determine a location of the mobile communication device;
    query, based on the location of the mobile communication device, a database for an information associated with the location of the mobile communication device, the information being different from the location of the mobile communication device; and
    determine, based on the information, that the mobile communication device is one of in an indoor state or an outdoor state;
    set, based on the mobile communication device being in the indoor state, the first switchable impedance matching circuitry to a state for the first antenna to communicate a WLAN signal in a WLAN frequency band; and
    set, based on the mobile communication device being in the outdoor state, the first switchable impedance matching circuitry to a state for the first antenna to communicate a GPS signal in a GPS frequency band.

* * * * *